Figure 1:
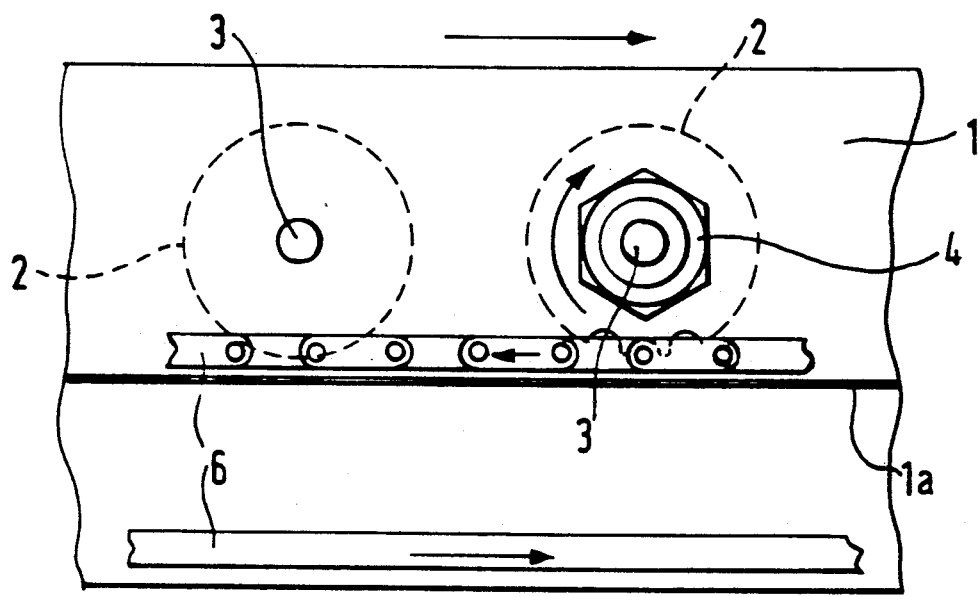

United States Patent [19]

Walker

[11] Patent Number: 5,076,421

[45] Date of Patent: Dec. 31, 1991

[54] SPROCKET CLUTCH

[75] Inventor: John G. Walker, Northlumberland, England

[73] Assignee: Automation Conveyors Limited, Northumberland, England

[21] Appl. No.: 548,892

[22] PCT Filed: Jan. 20, 1989

[86] PCT No.: PCT/GB89/00055

§ 371 Date: Jul. 20, 1990

§ 102(e) Date: Jul. 20, 1990

[87] PCT Pub. No.: WO89/07208

PCT Pub. Date: Aug. 10, 1989

[30] Foreign Application Priority Data

Feb. 1, 1988 [GB] United Kingdom ............ 8802128

[51] Int. Cl.$^5$ ............................................. B65G 13/06
[52] U.S. Cl. ................................... 198/781; 192/56 R
[58] Field of Search ................... 198/781, 789, 790; 192/56 R

[56] References Cited

U.S. PATENT DOCUMENTS 4,063,636 12/1977 vom Stein .................. 198/781
4,286,441 9/1981 Scheneman, Jr. et al. ..... 198/781 X

FOREIGN PATENT DOCUMENTS 1932790 1/1971 Fed. Rep. of Germany .

Primary Examiner—Joseph E. Valenza
Assistant Examiner—Tuan N. Nguyen
Attorney, Agent, or Firm—Thomas J. Dodd

[57] ABSTRACT

A clutch assembly for an accumulating roller conveyer such that torque transmission is accomplished by using clutch plates of deformable material which in association engage with the conveyer drive and conveyer rollers to allow the bearings to deform the surfaces of the clutch plates in transmitting the torque from the drive to the rollers.

16 Claims, 1 Drawing Sheet

SPROCKET CLUTCH

This invention relates to a slipping sprocket clutch for an accumulating roller conveyor.

An accumulating roller conveyor is a conveyor which has a plurality of transverse driven rollers, each of the rollers being driven via a respective slipping clutch. Each of the rollers is mounted on a respective shaft for conjoint rotation therewith, the shafts being drivable, via the slipping clutches, by a drive member extending longitudinally along the conveyor at one side thereof. The clutches are designed to permit slipping between the rollers and the drive member so that, when an item being conveyed is stopped, the clutches associated with the rollers engaging the item will slip. This ensures that these rollers are stationary, whilst all the other rollers continue to be driven Any other item on the conveyor does, therefore, continue to be conveyed. Consequently, items upstream of the stopped item will tend to accumulate behind the stopped item, and this gives rise to the term accumulating roller conveyor.

A known type of accumulating roller conveyor has a rotatable drive shaft extending along one side of the conveyor. Drive is transmitted to roller shafts via O-rings, each of which passes round the drive shaft and engages with a groove in a respective roller shaft. The O-rings constitute slipping clutches as they slip in the associated grooves when the corresponding rollers are prevented from rotating by a stationary item in contact therewith. The disadvantage of this type of conveyor is that the torque transmission from the drive shaft to the roller shafts depends upon the tension in the O-rings, and this is often insufficient to provide adequate torque transmission. Moreover, it is extremely difficult to control the tension in the O-rings so as to provide given torque transmission properties.

Another known type of accumulating roller conveyor has an endless drive chain constituting the drive member. This drive chain drives sprockets which in turn drive the roller shafts via slipping clutches. Each of these slipping clutches is a complicated ratchet arrangement having a plurality of cams and spring-loaded balls. The disadvantage of this type of conveyor is that it is difficult to assemble the clutches so as to give a desired torque transmission, and it is even more difficult subsequently to change their torque transmission properties. Because of its complicated construction, this type of conveyor is also relatively expensive.

In another known type of accumulating roller conveyor, the roller drive shafts are hexagonal, and the slipping clutches are constituted by deformable plastics tubes held in pockets in cages surrounding the shafts. The deformable plastics tubes associated with each of the hexagonal shafts are drivably engageable with the internal cylindrical surface of the corresponding roller so as to transmit torque thereto. Here again, drive is transmitted to the roller drive shafts, via sprockets fixed thereto, from an endless drive chain. If a given roller is prevented from rotation by a stationary item in contact therewith, the respective roller drive shaft can continue to rotate, with the plastics tubes being successively more and less deformed between that shaft and the internal cylindrical surface of the respective roller as the pointed regions of the shaft engage the plastics tubes. The disadvantage of this arrangement is that each clutch assembly needs four bearings, so that it is relatively expensive. Moreover, the rollers themselves require accurate machining, and extra sleeves are needed to accommodate the hexagonal shafts, and these steps entail further expense.

U.S. patent specification No. 4,286,441 describes an automatic slip coupling assembly for a roller conveyor. The slip coupling assembly incorporates a ball bearing which permits an associated sprocket to continue to rotate with slip taking place between the balls and an associated clutch plate, thereby preventing damage to conveyed goods if a jam occurs. Unfortunately, the bearing assembly is mounted on a journal bearing that can take up only radial loads. Any axial loads are taken up by the associated conveyor roller, and this leads to excessive wear. Another disadvantage of this arrangement is that many of the parts thereof are made of metal which cannot deform to absorb energy as the clutch slips. This again results in forces being applied to the moving parts of the assembly, and increases the rate of wear.

Known accumulating roller conveyor clutches also suffer from the disadvantage of a relatively low (0.2 Nm) torque transmission capability.

The aim of the invention is to provide a slipping sprocket clutch for an accumulating roller conveyor which is cheaper, more reliable, and has improved torque transmission characteristics when compared with known clutches.

The present invention provides a clutch assembly for an accumulating roller conveyor, the clutch assembly comprising a drive member formed by a sprocket which is drivably engageable with a conveyor drive means, a driven member which is drivably engageable with a roller of the conveyor, a first clutch plate associated with the drive member, a second clutch plate associated with the driven member, a bearing positioned between the first and second clutch plates and having a rolling element race, and thrust means for forcing the first and second clutch plates towards one another and against the rolling elements of the bearing, wherein the first and second clutch plates are made of an elastically-deformable plastics material, and wherein the drive member is rotatably mounted on a shaft sleeve by means of an angular contact bearing within the sprocket, the first and second clutch plates being generally annular and surrounding the shaft sleeve, and the shaft sleeve being fixed to, and rotatable with, the driven member, and the arrangement is such that the rolling elements elastically deform the surfaces of the first and second clutch plates whereby torque can be transmitted from the first clutch plate to the second clutch plate.

Advantageously, the sprocket is drivably engageable with an endless drive chain constituting the conveyor drive means, and the first clutch plate is constituted by a surface of the sprocket. Preferably, the arrangement is such that the rolling elements of the angular contact bearing elastically deform the races associated therewith.

In a preferred embodiment, the thrust means may be a thrust nut which is engageable with an externally-threaded portion of the shaft sleeve. Conveniently, the sprocket is made of a low-friction, thermoplastic material such as acetal.

The driven member may be a drive shaft fixed to, and rotatable with, the roller. Advantageously, the second clutch plate is constituted by a surface of a retaining ring, the retaining ring being positioned between the thrust means and the bearing. Conveniently, the retaining ring is made of a low-friction, thermoplastic material such as acetal. The shaft sleeve may also be made of a low-friction, thermoplastic material such as acetal. Preferably, the rolling elements of the bearing are balls made of a self-cleaning, high chromium special steel.

The invention also provides an accumulating roller conveyor comprising a plurality of rollers, conveyor drive means for driving the rollers, and a respective clutch assembly between the conveyor drive means and each of the rollers, wherein each clutch assembly is as defined above.

Preferably, the conveyor drive means is an endless drive chain in drivable engagement with the sprockets of the clutch assemblies.

Figure 2:
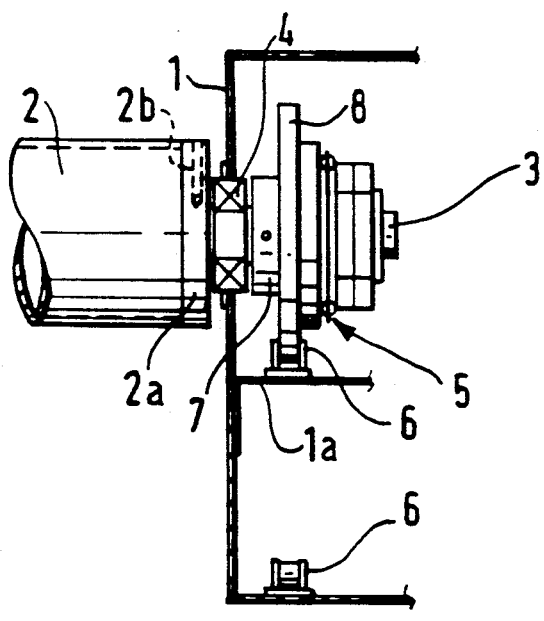
Figure 3:
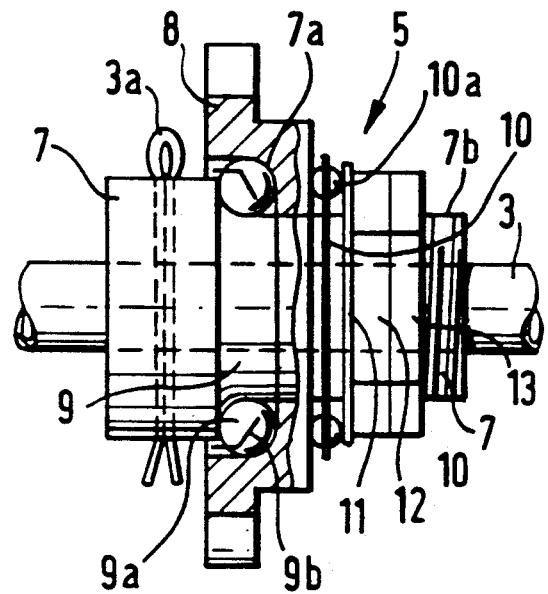

An accumulating roller conveyor incorporating slipping sprocket clutches constructed in accordance with the invention will now be described in detail, by way of example, with reference to the accompanying drawings, in which:

FIG. 1 is a side elevation of part of the conveyor;
FIG. 2 is an end elevation of the conveyor; and
FIG. 3 is a schematic sectional elevation of a slipping sprocket clutch of the conveyor.

Referring to the drawings, FIGS. 1 and 2 show part of one side plate 1 of an accumulating roller conveyor. The side plate 1 supports respective first ends of a plurality of transverse rollers 2, the other ends of the rollers being supported by a similar side plate (not shown). Each roller 2 is fixed to a respective shaft 3 for conjoint rotation therewith, and the ends of the shafts 3 are rotatably supported in the side plates by roller bearings 4 (one of which is shown in FIG. 2). The rollers 2 are hollow tubes made of stainless steel, and they are fixed to their shafts 3 by means of end plates 2a and grub screws 2b. The end plates 2a are made of aluminum.

The shafts 3 are rotatably driven, via respective slipping sprocket clutches (one of which is indicated generally by the reference numeral 5), by an endless drive chain 6. Each of the clutches 5 includes a shaft sleeve 7 (see FIG. 3), which is fixed to its associated shaft 3 by means of a split pin 3a which passes through aligned holes in the shaft and the shaft sleeve. A sprocket 8 is rotatably mounted on the shaft sleeve 7 via an angular contact bearing assembly 9, the balls 9a of which run in a groove 7a in the shaft sleeve. The balls 9a are held and spaced by a cage 9b. A thrust ring 10 supporting a plurality of ball bearings 10a bears against the rear face of the sprocket 8, and the thrust ring is held against this rear face by a retaining ring 11 and a thrust nut 12, the thrust nut being screwed onto an externally-threaded portion 7b of the shaft sleeve 7. A lock nut 13 is provided for holding the thrust nut 12 in position.

The shaft sleeve 7, the sprocket 8, the ring of the bearing assembly 9, the thrust ring 10 and the retaining ring 11 are all made of injection-moulded acetal, the threaded portion 7b of the shaft sleeve being formed during the injection moulding process. Alternatively, these parts could be made of polypropylene or other suitable low-friction, oil-free thermoplastic material. The balls 9a and 10a are made of a high chromium special steel that has self-cleaning properties. The nuts 12 and 13 are made of steel.

In use torque is transmitted from the drive chain 6 to each of the shafts 3 via four surfaces of the associated clutch, namely:

(i) the surface between the sprocket 8 and the balls 9a of the angular contact bearing assembly 9;

(ii) the surface between the balls 9a and the groove 7a of the shaft sleeve 7;

(iii) the surface between the sprocket 8 and the balls 10a of the thrust ring 10; and (iv) the surface between the balls 10a of the thrust ring 10 and the retaining ring 11.

The amount of torque transmitted is dependent upon the degree to which the thrust nut 12 is tightened, and ranges from 0 to 0.4 Nm for shaft rotation speeds of from 0 to 80 r.p.m. Moreover, it is a relatively easy task to alter the torque transmission characteristics of the clutches 5, after installation, by merely adjusting the degree to which the thrust nuts 12 are tightened.

When a given roller 2 is prevented from rotation by engagement with a stationary item, the associated clutch 5 slips, this slip occurring at all four surfaces mentioned above. The slip between the balls 10a and the surfaces of the sprocket 8 and the retaining ring 11 is subject to the Brinnel effect. This effect is a result of the elastic deformation of the plastic material of these surfaces by the balls 10a. Thus, when torque is being transmitted and no slip is occurring, the compressive force applied by the thrust nut 12 causes the balls 10a to embed themselves slightly into the opposing planar surfaces of the sprocket 8 and the retaining ring 11, the plastic material of these parts deforming elastically to permit this. This inward elastic deformation to accommodate the balls 10a causes a similar outwards elastic deformation to form 'peaks' either side of each ball. Once slip occurs, the balls 10a begin to rotate and to move, around a circular path, relative to both these surfaces. As this happens, the 'peaks' in front of the balls 10a are pushed round with the balls, so that the two surfaces are subjected to a continuous wave-like elastic deformation as the clutch 5 begins to slip.

Obviously, torque continues to be transmitted from the sprocket 8 to the shaft 3 of a given clutch as it slips, this torque being transmitted to the associated roller 2 which continues to try and advance the stationary item in contact therewith. The Brinnel effect is at a maximum when a given clutch 5 begins to slip, and hence more torque is transmitted at this time. This is because the previous lack of relative movement between the balls 10a and the two engaging surfaces has led to relatively deep depressions being formed in these surfaces (and hence to the formation of relatively large 'peaks' on either side of each ball), these relatively large 'peaks' helping to transmit a relatively high torque. As slip continues, the 'peaks' and depressions become less pronounced, so torque transmission is reduced (to about 80% of the initial slipping value).

Similarly, slip occurs between the balls 9a of the angular contact bearing assembly 9 and the associated races defined by the shaft sleeve 7 and the sprocket 8, and this slip is also subject to the Brinnel effect, and so the effect described above is enhanced.

This reduction in torque transmission, which results from a reduction in the Brinnel effect, has the advantage of reducing what is known as the 'queuing' force. Thus, when one item stops on the conveyor, the following items stop one after another in a queue behind the first stopped item. As the clutches 5 associated with the rollers 2 prevented from rotating by a stationary item begin to slip, the torque transmitted is reduced from what is known as the driving force to that of the 'queuing' force (which as explained above is about 80% of the driving force). Consequently, the force which tries to force the items against one another is reduced, and this is important where the items are fragile or squashable. Another advantage of this reduced 'queuing' force is that it leads to a reduction in power consumption during queuing.

The angular contact bearing assembly 9 has the advantage of allowing both the radial and the longitudinal forces, applied by the chain 6 and the thrust nut 12 respectively, to be taken up within the clutch assembly.

Because the sprocket 8 and the shaft sleeve 7 (which define the races of the angular contact bearing assembly 9) are made of plastics material, as the clutch slips energy can be absorbed by the clutch, not only at the bearing surfaces, but also as a result of the deflection of the sprocket and the shaft sleeve themselves. This deflection mainly takes place radially about the longitudinal axis of the sprocket 8, the sprocket increasing in size diametrically and cyclically as the balls 9a rotate within the bearing. This is due to the surfaces of the angular contact bearing assembly 9 being Brinnelled, giving variations in the distance between the two bearing surfaces of the bearing.

As shown in FIG. 1, the working run of the drive chain 6 (that is to say that portion of the drive chain engaging the sprockets 8) is supported by a shelf 1a fixed to the adjacent side plate 1. The upper surface of this shelf 1a is provided with a wear-resistant covering to minimise the wear on the drive chain 6.

The type of clutch 5 described above has a number of advantages compared with known accumulating conveyor clutches. In particular, the clutch 5 is relatively cheap to manufacture, and is easy to assemble. Moreover, this type of clutch is easily adjustable to vary the amount of torque transmitted. Furthermore, because torque is transmitted as a result of the Brinnel effect, a relatively high torque transmission capability results.

I claim:

1. A clutch assembly for an accumulating roller conveyor, the clutch assembly comprising a drive member formed by a sprocket which is drivably engageable with a conveyor drive means, a driven member which is drivably engageable with a roller of the conveyor, a first clutch plate associated with the drive member, a second clutch plate associated with the driven member, a bearing positioned between the first and second clutch plates and having a rolling element race, and thrust means for forcing the first and second clutch plates towards one another and against the rolling elements of the bearing, wherein the first and second clutch plates are made of an elastically-deformable plastics material, and wherein the drive member is rotatably mounted on a shaft sleeve by means of an angular contact bearing within the sprocket, the first and second clutch plates being generally annular and surrounding the shaft sleeve, and the shaft sleeve being fixed to, and rotatable with, the driven member, and the arrangement is such that the rolling elements elastically deform the surfaces of the first and second clutch plates whereby torque can be transmitted from the first clutch plate to the second clutch plate.

2. A clutch assembly for an accumulating roller conveyor, the clutch assembly comprising a drive member formed by a sprocket which is drivably engageable with a conveyor drive means, a driven member which is drivably engageable with a roller of the conveyor, a first clutch plate associated with the drive member, a second clutch plate associated with the driven member, a bearing positioned between the first and second clutch plates and having a rolling element race, and thrust means for forcing the first and second clutch plates towards one another and against the rolling elements of the bearing, wherein the first and second clutch plates are made of an elastically-deformable plastics material, and wherein the drive member is rotatably mounted on a shaft sleeve by means of an angular contact bearing, the first and second clutch plates being generally annular and surrounding the shaft sleeve, and the shaft sleeve being fixed to, and rotatable with, the driven member, and the arrangement is such that the rolling elements elastically deform the surfaces of the first and second clutch plates to form depressions therein, whereby torque can be transmitted from the first clutch plate to the second clutch plate, wherein the arrangement is such that the torque transmission is a maximum as the clutch begins to slip, the torque transmitted reducing as clutch slip continues and the depressions in said surfaces become less pronounced.

3. A clutch assembly as claimed in claim 1 or claim 2, wherein the arrangement is such that the rolling elements of the angular contact bearing elastically deform the races associated therewith.

4. A clutch assembly for an accumulating roller conveyor, the clutch assembly comprising a drive member formed by a sprocket which is drivably engageable with a conveyor drive means, a driven member which is drivably engageable with a roller of the conveyor, a first clutch plate associated with the drive member, a second clutch plate associated with the driven member, a bearing positioned between the first and second clutch plates and having a rolling element race, and thrust means for forcing the first and second clutch plates towards one another and against the rolling elements of the bearing, wherein the first and second clutch plates are made of an elastically-deformable plastics material, and wherein the drive member is rotatably mounted on a shaft sleeve by means of another bearing within the sprocket, the first and second clutch plates being generally annular and surrounding the shaft sleeve, and the shaft sleeve being fixed to, and rotatable with, the driven member, and the arrangement is such that the rolling elements elastically deform the surfaces of the first and second clutch plates to form depressions therein, whereby torque can be transmitted from the first clutch plate to the second clutch plate.

5. The clutch assembly of claim 4, wherein said another bearing constitutes means for the taking up both radial and longitudinal forces.

6. A clutch assembly of claim 1 or 5, wherein the sprocket is drivably engageable with an endless drive chain constituting the conveyor drive means.

7. A clutch assembly of claim 1 or 5, wherein the first clutch plate is constituted by a surface of the sprocket.

8. A clutch assembly of claim 1 or 5, wherein the thrust means is a thrust nut which is engageable with an externally-threaded portion of the shaft sleeve.

9. A clutch assembly of claim 1 or 5, wherein the sprocket is made of a low-friction, thermoplastic material such as acetal.

10. A clutch assembly of claim 1 or 5, wherein the driven member is a drive shaft fixed to, and rotatable with, the roller.

11. A clutch assembly as claimed in claim 10, wherein the second clutch plate is constituted by a surface of a retaining ring, the retaining ring being positioned between the thrust means and the bearing.

12. A clutch assembly as claimed in claim 11, wherein the retaining ring is made of a low-friction, thermoplastic material such as acetal.

13. A clutch assembly of claim 1 or 5, wherein the shaft sleeve is made of a low-friction, thermoplastic material such as acetal.

14. A clutch assembly of claim 1 or 5, wherein the rolling elements of the bearing are balls made of a self-cleaning, high chromium special steel.

15. A clutch assembly as claimed in claim 1, wherein said clutch assembly is between said roller and conveyer drive means.

16. A clutch assembly as claimed in claim 15, wherein the conveyer drive means is an endless chain which engages the sprocket of each clutch assembly of a plurality of clutch assemblies.

* * * * *